United States Patent
Nguyen et al.

(10) Patent No.: US 9,300,861 B2
(45) Date of Patent: Mar. 29, 2016

(54) VIDEO RECORDING APPARATUS AND FOCUSING METHOD FOR THE SAME

(71) Applicant: PANASONIC INTELLECTUAL PROPERTY MANAGEMENT CO., LTD., Osaka (JP)

(72) Inventors: Khang Nguyen, Osaka (JP); Takashi Kawamura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/612,258

(22) Filed: Feb. 2, 2015

(65) Prior Publication Data

US 2015/0222808 A1 Aug. 6, 2015

(30) Foreign Application Priority Data

Feb. 3, 2014 (JP) .................................. 2014-018866
Apr. 21, 2014 (JP) .................................. 2014-087328

(51) Int. Cl.
*H04N 5/232* (2006.01)
*G03B 13/36* (2006.01)

(52) U.S. Cl.
CPC ............ *H04N 5/23212* (2013.01); *G03B 13/36* (2013.01); *H04N 5/23287* (2013.01)

(58) Field of Classification Search
CPC .......... H04N 5/23212; H04N 5/23293; H04N 5/23248; H04N 5/2226; H04N 5/3656; H04N 13/0011; G03B 13/36; G03B 13/10; G03B 17/20; G03B 2205/0007; G03B 2217/005; G02B 7/282; G02B 7/365; G06T 19/20; G06T 5/001; G06T 5/002; G06T 2207/10028; G06T 7/0069; G06K 9/46; G01C 3/32

USPC .................................................. 348/345–349
See application file for complete search history.

(56) References Cited

U.S. PATENT DOCUMENTS

| 8,488,048 | B2 | 7/2013 | Kawanishi |
| 8,836,825 | B2 * | 9/2014 | Imamura ....................... 348/241 |
| 9,142,582 | B2 * | 9/2015 | Ando et al. |
| 2011/0149133 | A1 | 6/2011 | Kawanishi |
| 2013/0121537 | A1 * | 5/2013 | Monobe et al. ............... 382/106 |
| 2013/0141634 | A1 * | 6/2013 | Korenaga et al. ............. 348/360 |

(Continued)

FOREIGN PATENT DOCUMENTS

| JP | 2963990 B1 | 10/1999 |
| JP | 2011-015163 A | 1/2011 |
| JP | 2011-133528 A | 7/2011 |

*Primary Examiner* — Pritham Prabhakher
(74) *Attorney, Agent, or Firm* — McDermott Will & Emery LLP

(57) ABSTRACT

Provided is a video recording apparatus that can generate image signals to increase a difference in amount of blur in recording video using a rolling shutter during wobbling, and includes: an image sensor that generates an image signal corresponding to an image; a driving unit that drives a focus lens along an optical axis; and a control unit that controls the driving unit for controlling a focus in an optical system, while the focus lens is wobbling, wherein the control unit (i) generates blur signals to increase a difference in amount of blur in a predetermined region by controlling imaging timings at which the image sensor captures the image, (ii) calculates distance information on a distance to the object to be displayed in the region, using blur signals in the region among the generated blur signals, and (iii) controls the focus using the distance information.

5 Claims, 6 Drawing Sheets

(56) References Cited

U.S. PATENT DOCUMENTS

2013/0293704 A1* 11/2013 Imamura et al. ............. 348/135
2014/0146219 A1* 5/2014 Kawamura .................... 348/349
2014/0184853 A1* 7/2014 Ogawa ......................... 348/239

* cited by examiner

VIDEO RECORDING APPARATUS AND FOCUSING METHOD FOR THE SAME

CROSS REFERENCE TO RELATED APPLICATIONS

The present application is based on and claims priority of Japanese Patent Application No. 2014-018866 filed on Feb. 3, 2014 and Japanese Patent Application No. 2014-87328 filed on Apr. 21, 2014. The entire disclosure of the above-identified application, including the specification, drawings and claims is incorporated herein by reference in its entirety.

FIELD

The present disclosure relates to a video recording apparatus that controls focus while a focus lens and an image sensor are wobbling, and a focusing method for the video recording apparatus.

BACKGROUND

Various methods for video recording apparatuses and others for contactless measurement of a depth in a three-dimensional scene, that is, a distance to each object have been proposed. The methods can be broadly divided into two, namely, (i) methods for actively calculating the distance based on an arrival time or an angle of reflected waves after irradiating an object with, for example, infrared rays, ultrasound, and laser light and (ii) methods for passively calculating the distance based on an image of an object. Particularly, the passive methods that do not require any device that irradiates an object with infrared rays or others have widely been applied to cameras.

Out of many of the passive methods that have been proposed, Depth from Defocus (abbreviated as "DFD" hereinafter) is a method for measuring a distance to an object based on blur information which varies in size and shape according to the distance to the object. The DFD features, for example, measuring a distance to an object, using the less number of images captured by a single camera.

The following simply describes the principle of the DFD.

The DFD is a method for measuring a distance to an object using images having different focal points, based on blur information. A blurred image is considered as an image obtained by convolving a point spread function (abbreviated as "PSF" hereinafter) that is a function representing an object distance, into an all-in-focus image having no blur caused by the lens. Since the PSF is a function representing an object distance, the object distance can be computed in the DFD by estimating blur from the blurred captured image. Here, the all-in-focus image and the object distance are unknowns. An equation expressing a blurred image, an all-in-focus image, and an object distance holds for one blurred image. Thus, new blurred images having different focal points are captured, and the corresponding equations are obtained. The obtained equations are solved to find object distances. Various proposals on the DFD including Patent Literature (PTL) 1 have been made as methods for obtaining and solving such equations.

CITATION LIST

Patent Literature

[PTL] Japanese Patent No. 2963990

SUMMARY

Technical Problem

The present disclosure provides a video recording apparatus that can focus on an object when video of the object is recorded using a rolling shutter while at least one of a focus lens and an image sensor is wobbling.

Solution to Problem

The video recording apparatus according to the present disclosure includes: an optical system including a focus lens; an image sensor that generates an image signal based on an image obtained through the optical system, using a rolling shutter; a driving unit configured to change a distance between the focus lens and the image sensor, along an optical axis of the optical system; and a control unit configured to control the driving unit so that the focus lens focuses on an object, while at least one of the focus lens and the image sensor is wobbling to periodically change the distance between the focus lens and the image sensor, the control unit including: a region identifying unit configured to identify a region in the image; a timing adjusting unit configured to adjust imaging timings according to the distance between the focus lens and the image sensor to increase a difference between an amount of blur obtained from a first image signal in the identified region and an amount of blur obtained from a second image signal in the identified region, each of the imaging timings being a timing at which the first image signal or the second image signal corresponding to the image is generated; a distance calculating unit configured to calculate distance information on a distance to the object to be displayed in the identified region, using image signals including the first image signal and the second image signal in the identified region among image signals generated at the adjusted imaging timings; and a focal position determining unit configured to determine a focal position between the focus lens and the image sensor, using the distance information.

Advantageous Effects

When the video recording apparatus according to the present disclosure captures an image using a rolling shutter while a focus lens, an image sensor, or others are wobbling, the control unit can adjust the imaging timings at each of which the image is captured to correspond to the wobbling. Specifically, the video recording apparatus can capture an image according to a distance between the focus lens and the image sensor during the wobbling. Thus, a difference in amount of blur between image signals in a region including image signals obtained through the capturing can be increased. Accordingly, the DFD using such image signals can be performed without degrading its performance.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENT

Embodiments according to the present disclosure will be described with reference to the drawings as appropriate. The detailed description more than necessary may be omitted. For example, detailed description of well-known facts and overlapping description of substantially identical configurations may be omitted. These prevent the description from being redundant and make a person skilled in the art to easily understand the description.

The Inventors provide the Description and the Drawings for the person skilled in the art to easily understand the present disclosure, and do not intend to limit the subject matter of the description into the scope of the claims.

(Embodiment)

Non-limiting Embodiment will be described with reference to FIGS. 1 to 4.

(Electrical and Structural Configuration)

The electrical and structural configuration of a video recording apparatus 1 according to Embodiment will be described with reference to the drawings.

Figure 1:
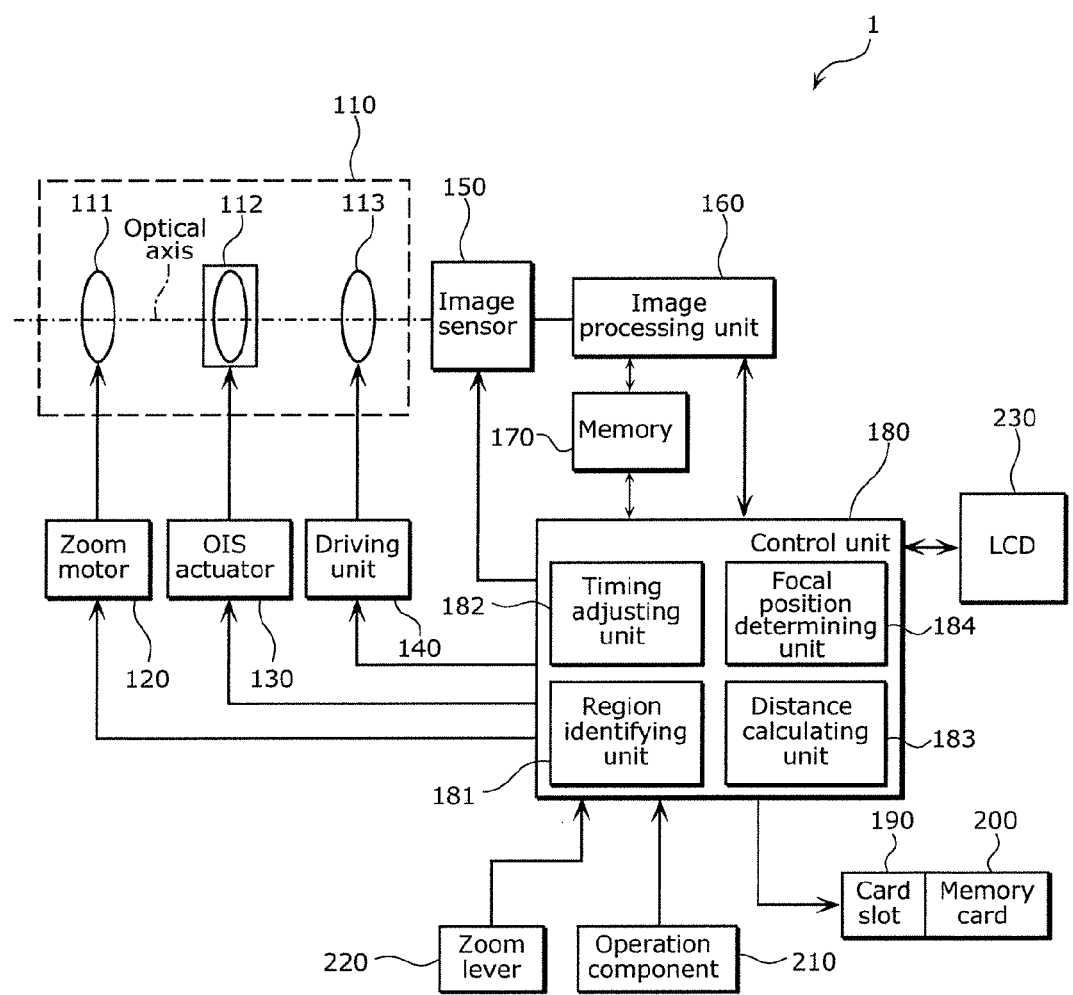
FIG. 1 is a block diagram illustrating an electrical and structural configuration of a video recording apparatus according to an embodiment.

FIG. 1 specifically illustrates the video recording apparatus 1.

The video recording apparatus 1 includes an optical system 110, a zoom motor 120, an optical image stabilizer (OIS) actuator 130, a driving unit 140, an image sensor 150 including a CMOS, an image processing unit 160, a memory 170, a control unit 180, a memory card 200, a card slot 190 into which the memory card 200 can be inserted, an operation component 210, a zoom lever 220, and a liquid crystal display (LCD) 230.

The optical system 110 includes a zoom lens 111, an OIS 112, a focus lens 113, and a diaphragm (not illustrated).

The zoom lens 111 shifts along an optical axis of the optical system 110 to enlarge or reduce an image of an object. Specifically, the zoom motor 120 changes the position of the zoom lens 111 in the optical system 110, based on a control signal from the control unit 180 to enlarge or reduce the image of the object. The position of the zoom lens 111 can be manually changed.

The OIS 112 includes a correction lens movable within a plane perpendicular to the optical axis. The OIS 112 reduces the blur in the image by driving the correction lens in a direction that compensates a shake of the video recording apparatus 1. The correction lens can be moved from the center by a predetermined distance within the OIS 112. The OIS 112 is controlled by the OIS actuator 130.

The focus lens 113 shifts along the optical axis of the optical system 110 to focus on the object. The focus lens 113 is driven by the driving unit 140 to be placed at a focal position. This driving operation is more dynamic than wobbling.

The zoom motor 120 drives the zoom lens 111. The zoom motor 120 may be a pulse motor, a DC motor, a linear motor, or a servomotor. The zoom motor 120 may drive the zoom lens 111 using, for example, a cam mechanism and a ball screw mechanism.

The OIS actuator 130 drives the correction lens in the OIS 112, within the plane perpendicular to the optical axis. The OIS actuator 130 may be, for example, a planar coil or an ultrasound motor.

The driving unit 140 is a device including an actuator that changes a distance between the focus lens 113 and the image sensor 150, along the optical axis of the optical system 110. The actuator according to Embodiment is a motor that drives the focus lens 113 along the optical axis. The driving unit 140 may include a pulse motor, a DC motor, a linear motor, and a servomotor. The driving unit 140 may drive the focus lens 113 using, for example, a cam mechanism and a ball screw mechanism.

According to Embodiment, the driving unit 140 can perform a focus operation that is a dynamic operation to change a focal position, and a minute reciprocating motion for wobbling the focus lens 113, based on a control signal from the control unit 180 in auto focus (AF) mode. Accordingly, AF control can be efficiently performed during, for example, recording video.

Here, the wobbling is a minute reciprocating motion so that the distance between the focus lens 113 and the image sensor 150 varies. According to Embodiment, the focus lens 113 is wobbled at a focal position. Here, the reciprocating motion is minute to an extent that a person cannot recognize or can ignore out-of-focus in seeing the video.

The image sensor 150 is a sensor that captures an image formed by the optical system 110 and generates an image signal, for example, a sensor including a CMOS image sensor. The image sensor 150 performs various operations, such as exposure, transfer, and electronic shutter. Specifically, the image sensor 150 is a sensor capable of employing the rolling shutter, and thus may be a CMOS image sensor. The rolling shutter is a method of obtaining light sequentially received by imaging pixels arranged in rows and columns as charge, with delay on a row (or column) basis, and generating an image signal corresponding to the image.

Furthermore, the image sensor 150 is controlled by a timing adjusting unit 182 of the control unit 180 that adjusts imaging timings at each of which the image signal corresponding to the image formed by the optical system 110 is generated.

The image processing unit 160 performs various processes on the image signal generated by the image sensor 150. The image processing unit 160 processes the image signal, generates image data (hereinafter referred to as "review image") to be displayed on the LCD 230, and generates a video signal to be re-stored in the memory card 200. For example, the image processing unit 160 performs, on the image signal, various image processes, such as gamma correction, white balance correction, and flaw correction.

The image processing unit 160 may be, for example, a digital signal processor (DSP) and a microcomputer. The resolution of a review image may be set to a screen resolution of the LCD 230, and to a resolution of image data compressed and formed in, for example, a compression format in conformity with the JPEG.

The memory 170 functions as a main memory for the image processing unit 160 and the control unit 180. The memory 170 temporarily stores a video signal processed by the image processing unit 160 or an image signal fed by the image sensor 150 prior to the processing by the image processing unit 160. Furthermore, the memory 170 temporarily stores imaging conditions of the optical system 110 and the image sensor 150 in the imaging. The imaging conditions include an object distance, angle-of-view information, an ISO speed, a shutter speed, an exposure value (EV), an f-number, a distance between lenses, an imaging time, an OIS shift amount, and position information of the focus lens 113 in the optical system 110. The memory 170 may be, for example, a DRAM and a ferroelectric memory.

The control unit 180 is a control unit for controlling the whole video recording apparatus 1. According to Embodiment, the control unit 180 includes a region identifying unit 181, the timing adjusting unit 182, a distance calculating unit 183, and a focal position determining unit 184. The control unit 180 may include a semiconductor device. The control unit 180 may be implemented only by hardware, or a combination of hardware and software. The control unit 180 may include, for example, a microcomputer.

Specifically, the control unit 180 causes the driving unit 140 to wobble the focus lens 113, and places the focus lens 113 at a focal position. Accordingly, the control unit 180 can efficiently perform AF control.

The timing adjusting unit 182 controls imaging timings at each of which the image sensor 150 generates the image signal corresponding to the image formed by the optical system 110 (for example, timing at which the image sensor 150 starts generating an image signal). Here, the timing adjusting unit 182 controls the imaging timings based on position information of the focus lens 113 in the optical system 110, that is, distance information between the focus lens 113 and the image sensor 150 that are wobbling. Accordingly, when the video recording apparatus 1 captures an image of the subject using a rolling shutter while the focus lens 113 is wobbling, the timing adjusting unit 182 can adjust a row (or a column) of imaging pixels that generate an image signal according to the position of the focus lens 113. Thus, the video recording apparatus 1 can generate, for example, (i) an image signal from a row of imaging pixels in a center region of an image (refer to a region C in FIG. 4) when an image signal is obtained at a near end at which a distance between the focus lens 113 and the image sensor 150 is the shortest, and (ii) an image signal from a row of imaging pixels in the center region of the image when an image signal is obtained at a far end at which the distance between the focus lens 113 and the image sensor 150 is the longest.

The timing adjusting unit 182 adjusts imaging timings so that a difference between an amount of blur obtained from a first image signal in a region identified by the region identifying unit 181 and an amount of blur obtained from a second image signal in the same region (for example, a difference in amount of blur between adjacent image signals among image signals continuously obtained in a specific region in recording video) is larger than a difference between an amount of blur obtained from a third image signal in a region other than the region identified by the region identifying unit 181 and an amount of blur obtained from a fourth image signal in the other region.

Furthermore, the timing adjusting unit 182 may adjust the imaging timings so that a difference in amount of blur between two image signals in a specific region is larger than a predetermined threshold.

The timing adjusting unit 182 that controls the imaging timings according to a position of the focus lens 113 in Embodiment is not limited to this configuration. The timing adjusting unit 182 may be any as long as the position of the focus lens 113 and the imaging timings can be adjusted. For example, the timing adjusting unit 182 may control the imaging timings to adjust the position of the focus lens 113 according to each of the imaging timings.

Since the difference in amount of blur between images is the most frequently adjusted in the specific region according to Embodiment, the difference in contrast value is similarly larger in the specific region. Thus, AF control can be performed using a conventional contrast value. Furthermore, the timing adjusting unit 182 can perform AF control, using both the conventional contrast value and a conventional method of using a contrast value.

The card slot 190 is a slot into which the memory card 200 can be inserted. In other words, the card slot 190 can be mechanically or electrically connected to the memory card 200.

The memory card 200 includes a flash memory and a ferroelectric memory, and can store data.

The operation component 210 includes a release button. The release button is pressed to receive an operation by the user. When the user presses the release button halfway down, the video recording apparatus 1 starts the AF control and automatic exposure (AE) control through the control unit 180. Furthermore, when the user presses the release button all the way down, the video recording apparatus 1 captures an image of an object.

The zoom lever 220 is a component that receives an instruction for changing a zoom magnification from the user.

The LCD 230 is a display device that displays the image signal generated by the image sensor 150 or the image signal read from the memory card 200. Furthermore, the LCD 230 can display various setting information items of the video recording apparatus 1. For example, the LCD 230 can display the imaging conditions in imaging, such as an EV, an f-number, a shutter speed, and an ISO speed.

Furthermore, the LCD 230 includes a touch panel (not illustrated) as a designating unit that designates a region. The user can designate a region in the image displayed by the LCD 230, through the LCD 230.

(Details of AF Operation in Imaging)

The specific details of the AF control in imaging by the video recording apparatus 1 will be described with reference to the drawings.

Figure 2:
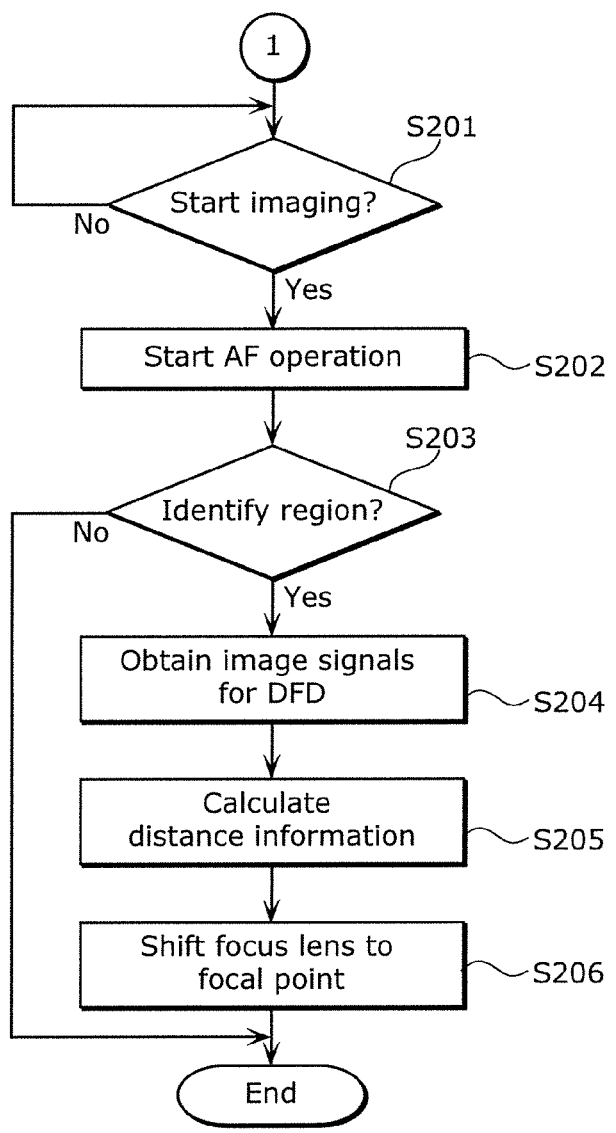
FIG. 2 is a flowchart indicating a focusing method for a video recording apparatus according to an embodiment.

FIG. 2 is a flowchart for describing the AF control when the image processing apparatus 1 starts recording video.

(S201) The control unit 180 waits for an imaging state upon operation of the operation component 210 by the user.

(S202) When the user operates the operation component 210 and the video recording apparatus 1 starts recording video, the video recording apparatus 1 starts an AF operation. Furthermore, the image sensor 150 captures the image obtained through the optical system 110 to start generating the image signal. The control unit 180 controls the driving unit 140 while the focus lens 113 is wobbling with respect to the current focal point. As such, the video recording apparatus 1 according to Embodiment records video by performing AF control while the focus lens 113 is wobbling during the recording.

(S203) The region identifying unit 181 identifies a region in a designated image, by operating the operation component 210 or a touch panel displayed on the surface of the LCD 230. Here, the operation component 210 or the touch panel functions as a designating unit of the user. Furthermore, the region identifying unit 181 identifies a region designated by the designating unit through other processes such as a facial recognition system and an object tracking process, based on the image signal obtained from the image processing unit 160.

(S204) The control unit 180 causes the image sensor 150 to generate image signals for the DFD that correspond to positions of the focus lens 113 and obtains the image signals, while the focus lens 113 is wobbling. The imaging timings at which the image signals for the DFD are captured will be described later.

The image signals for the DFD are image signals representing video according to Embodiment. The image sensor 150 generates the image signals for the DFD.

(S205) The distance calculating unit 183 applies the DFD to the image signals for the DFD obtained from the image sensor 150. Accordingly, the distance calculating unit 183 calculates the distance information on a distance to an object to be displayed as image signals for the DFD. According to Embodiment, the distance calculating unit 183 calculates only the distance information on a distance to an object to be displayed in a region identified by the region identifying unit 181, using image signals in the region among the image signals generated by the image sensor 150. Accordingly, the distance calculating unit 183 can apply the DFD faster than the DFD on all the image signals generated by the image sensor 150.

The PSF satisfying the imaging conditions in capturing images for the DFD is desirably used in the DFD. The PSF may be calculated in real time under the imaging conditions or selected from a database calculated in advance.

(S206) The focal position determining unit 184 controls the driving unit 140 so that the focus lens 113 focuses on a predetermined object, based on the distance information calculated by the distance calculating unit 183 at Step S204, and shifts the focus lens 113 to the focal position.

(Imaging Timings)

The imaging timings at S203 will be described with reference to the drawings.

The control unit 180 in the video recording apparatus 1 according to Embodiment sets imaging timings at each of which the image signal for the DFD is captured, according to the position of the focus lens 113 that is wobbling in the optical system 110. Accordingly, the difference in amount of blur in a desired region in an image can be increased by adjusting the imaging timings according to the position of the focus lens 113 in the optical system 110, even when the focus lens 113 is wobbling and the image signal is generated using a rolling shutter. As a result, the desired region can be processed without substantially degrading the accuracy of the DFD.

Figure 3:
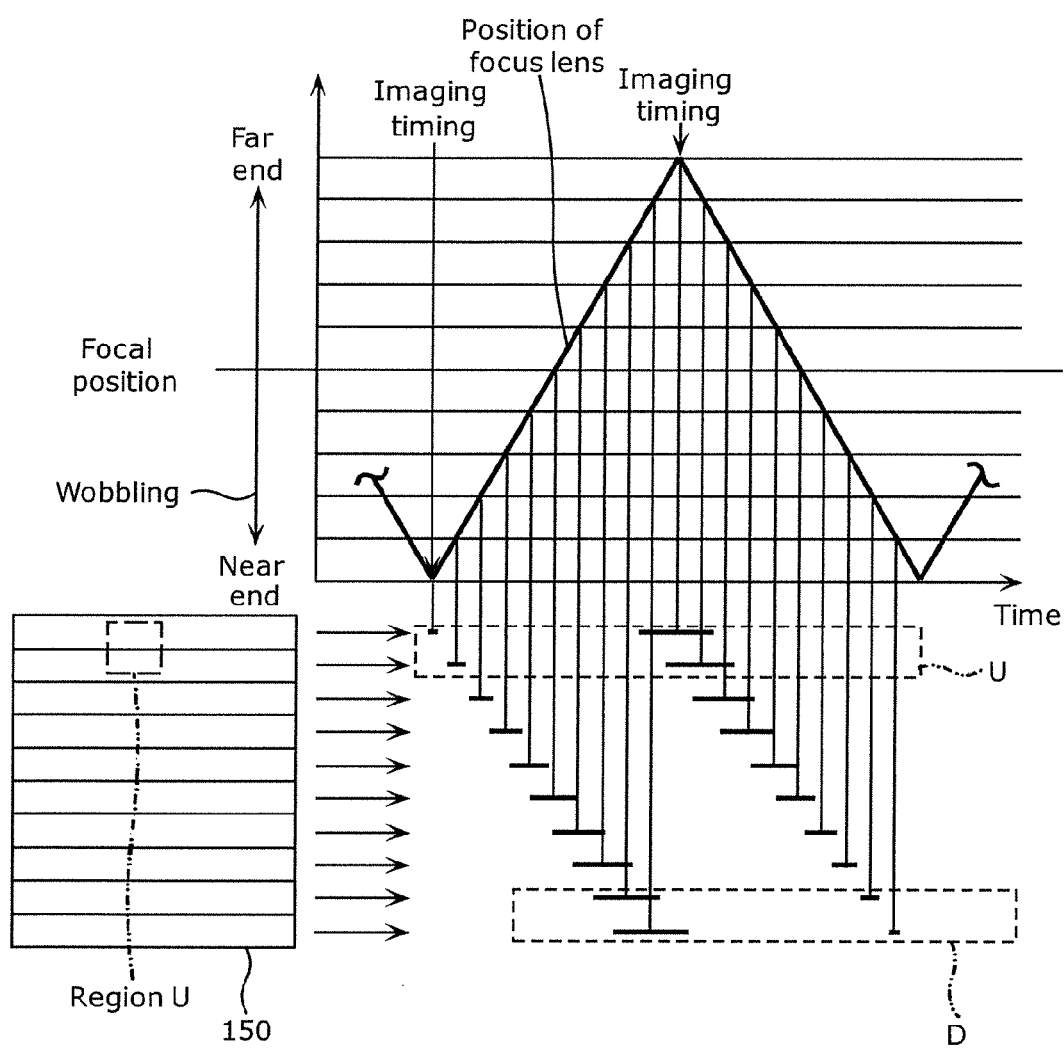
FIG. 3 illustrates imaging timings controlled by a control unit according to an embodiment.
Figure 4:
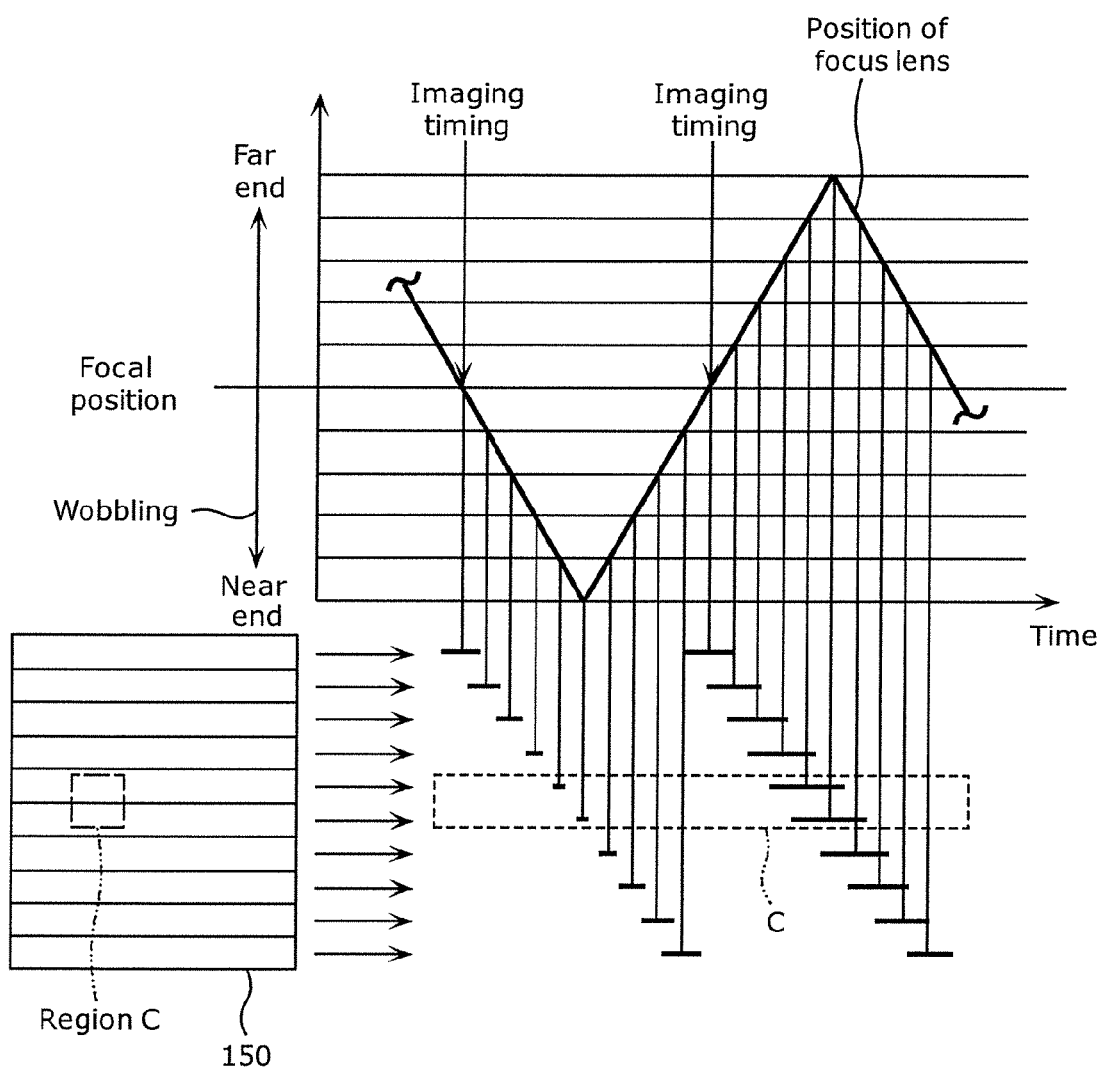
FIG. 4 illustrates other imaging timings controlled by a control unit according to an embodiment.

FIGS. 3 and 4 are graphs for describing the imaging timings.

The vertical axis of the graphs in the upper portions of FIGS. 3 and 4 indicates the position of the focus lens 113 in the optical system 110 when the focus lens 113 is wobbling. According to Embodiment, the focus lens 113 is reciprocating between the near end and the far end with respect to the focal position as a wobbling motion.

Each of the horizontal bars under the graphs indicates the amount of blur. As the bar is longer, the image is more blurred. Furthermore, the rectangle to the left of the horizontal bars virtually illustrates the image sensor 150. Each of the arrows between the horizontal bars and the image sensor 150 indicates a correspondence between the row at which an image signal is generated in the image sensor 150 and the amount of blur corresponding to the image signal.

Specifically, the focus lens 113 periodically reciprocates between the near end at which the distance to the image sensor 150 is the shortest and the far end at which the distance to the image sensor 150 is the longest, along the optical axis while the wobbling.

Here, the amount of blur is the smallest when the focus lens 113 is at the near end, whereas the amount of blur is the largest when the focus lens 113 is at the far end. However, these are examples, and do not indicate absolute amounts of blur. The amounts of blur differ according to a focal point (the center of the wobbling motion according to Embodiment) or the actual distance to the object.

FIG. 3 indicates the imaging timings without substantially degrading the accuracy of the DFD in the upper region of the image signals.

The DFD requires image signals (for example, two images) captured at different focal points. Here, when the DFD is applied to image signals captured at focal points closer to the focus lens 113, the accuracy is degraded. Conventionally, the focus lens 113 is fixed at the far end to obtain a first image signal, and shifts to the near end and fixed there to obtain a second image signal so as not to degrade the accuracy of the DFD. In contrast, an image signal is obtained using a rolling shutter while the focus lens 113 is being shifted according to Embodiment. Here, the timing at which (i) the row (or column) of the image sensor 150 corresponding to a specific region one desires to bring into focus obtains an image signal and (ii) the position at which the focus lens 113 is wobbling are adjusted so that the row (or column) of the image sensor 150 obtains the image signals as far as possible from the focus lens 113.

When the region that one desires to bring into focus and is identified by the region identifying unit 181 is in the upper region U of the image signals, the control unit 180 adjusts the imaging timings corresponding to the position of the focus lens 113 as indicated in FIG. 3. Specifically, assuming that an imaging timing is a timing at which an image is captured when the focus lens 113 is at the near end, image signals for the DFD are sequentially obtained by adjusting the imaging timings from a row of imaging pixels that is at one end of the image sensor 150. Furthermore, assuming that an imaging timing is a timing at which an image is captured when the focus lens 113 is at the far end, other image signals for the DFD are sequentially obtained by adjusting the imaging timings from the row of imaging pixels that is at the end of the image sensor 150.

According to Embodiment, the control unit 180 controls the position of the focus lens 113 and the imaging timings of the image sensor 150 to obtain, for an image corresponding to the upper region U, image signals in a state where the difference in position of the focus lens 113 is maximized. Through adjustment of the imaging timings by the timing adjusting unit 182, a difference between distances to the focus lens 113 at which two images of the upper region U are captured can be larger than a difference between distances to the focus lens 113 at which two images of the center region are captured. Accordingly, the AF control can be performed without substantially degrading the accuracy of the DFD in the upper region U.

According to Embodiment, the half cycle of the wobbling almost matches the time required for using a rolling shutter once. Thus, when the lower region D includes a region one desires to bring into focus, the timing adjusting unit 182 of the control unit 180 may adjust the imaging timings in the same manner as when the upper region U includes a region one desires to bring into focus. Here, the amounts of blur of the lower region D and the upper region U are the same. However, the sequence of the image signals to be applied and the amounts of blur at the far end and at the near end in the lower region D are opposite to those in the upper region U. Thus, the DFD includes reversing the sequence of the image signals to be applied and calculating the amounts of blur for obtaining the opposite result.

When one desires to bring a region in the lower region D into focus without such additional processes, the imaging timing at which a first image signal for the DFD is obtained has only to be adjusted to a time at which the focus lens 113 is at the far end or closer to the far end, and then the imaging timing at which a second image signal for the DFD is obtained has only to be adjusted to a time at which the focus lens 113 is at the near end or closer to the near end.

FIG. 4 indicates the imaging timings without substantially degrading the accuracy of the DFD in the center region C of the image signals to which the DFD has been applied.

As indicated in FIG. 4, the timing adjusting unit 182 of the control unit 180 controls the imaging timings of the image sensor 150 so that (i) when a first image signal is obtained, the center region C of the image signals is captured at the timing at which the focus lens 113 is at the near end and (ii) when a second image signal is obtained, the center region C of the image signals is captured at the timing at which the focus lens 113 is at the far end. Through adjustment of the imaging timings to correspond to a region one desires to bring into focus, a difference between distances to the focus lens 113 at which two images of the center region C are captured can be larger than a difference between distances to the focus lens 113 at which two images of another region are captured. Accordingly, the AF control can be performed without substantially degrading the accuracy of the DFD in the center region C.

Specifically, the timing adjusting unit 182 adjusts the imaging timings at each of which the image sensor 150 captures an image so that during the wobbling (i) a first image signal in a region to be used in the DFD is generated at the timing at which the focus lens 113 is at the near end and (ii) a second image signal in the region is generated at the timing at which the focus lens 113 is at the far end.

Embodiment describing a focusing method for increasing a difference in amount of blur in a region identified by the user or through other processes is not limited to such configuration. The imaging timings may be adjusted to always prioritize, for example, the upper region U, the lower region D, and the center region C.

Furthermore, since the region identified by the region identifying unit 181 may fluctuate, the timing adjusting unit 182 may readjust the imaging timings according to the fluctuating region. Specifically, when the designating unit designates a region through, for example, a facial recognition system and an object tracking process, the region identifying unit 181 newly identifies a region for the designated region according to the movement of the object, and the timing adjusting unit 182 adjusts the imaging timings according to the newly identified region.

The control unit 180 in the DFD may process only the image signal corresponding to the upper region U or the lower region D among the image signals obtained at the imaging timings indicated in FIG. 3. Furthermore, the control unit 180 in the DFD may process only the image signal corresponding to the center region C among the image signals obtained at the imaging timings indicated in FIG. 4.

Figure 5:
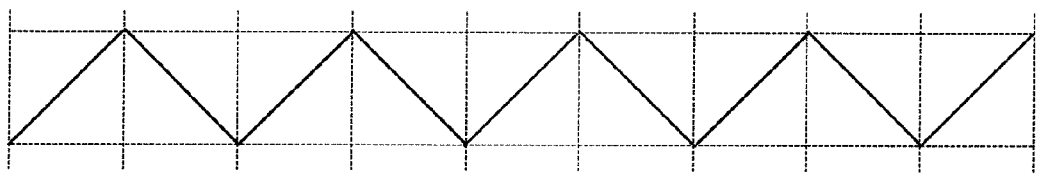
FIG. 5 illustrates a wobbling pattern.
Figure 6:
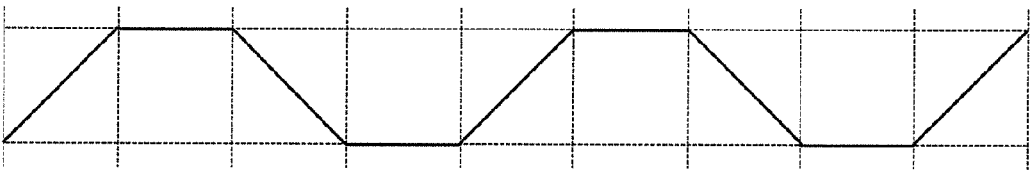
FIG. 6 illustrates a wobbling pattern.
Figure 7:
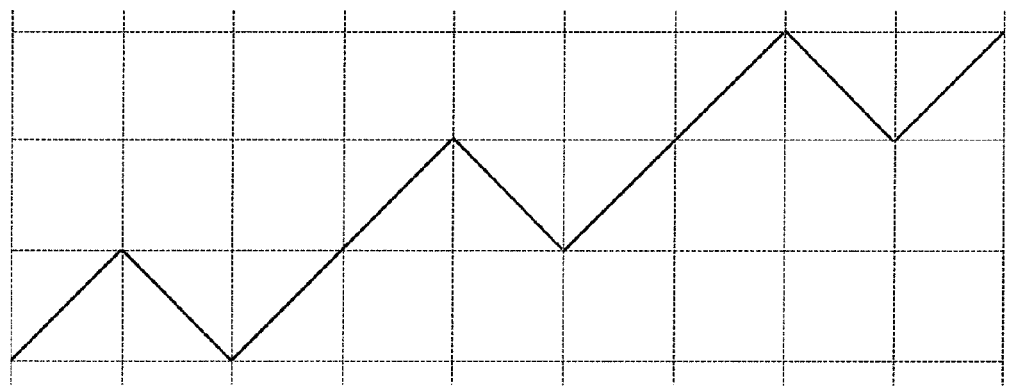
FIG. 7 illustrates a wobbling pattern.
Figure 8:
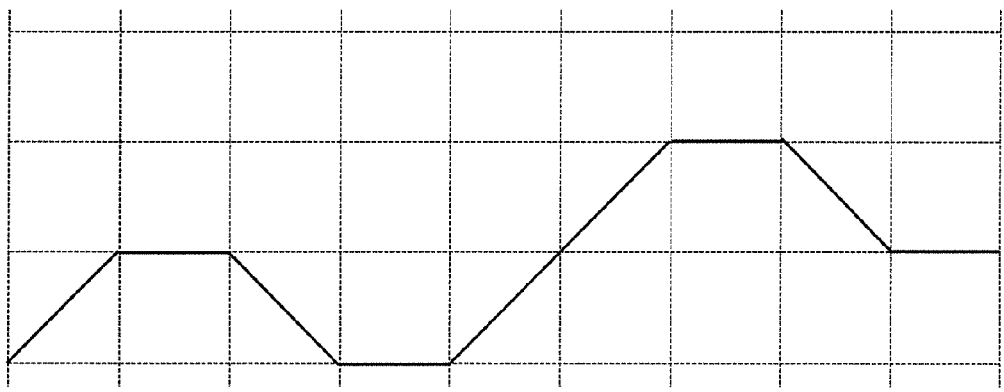
FIG. 8 illustrates a wobbling pattern.

Embodiment describing the wobbling as a reciprocating motion of a focus lens with respect a certain position as indicated in FIG. 5 is not limited to this configuration. For example, as exemplified in FIG. 6, the focus lens may be controlled so that it moves, temporarily stops, and then moves again. Furthermore, as exemplified in FIGS. 7 and 8, the focus lens may be reciprocating while being moved in a predetermined direction without fixing the center position of the wobbling to speed up the AF motion.

A prioritized region may be designated by an operation of the user through the operation component 210 functioning as a designating unit, or by causing a program functioning as the designating unit to perform facial recognition or other processes.

(Summary)

The video recording apparatus 1 according to Embodiment includes: the image sensor 150 that captures, using a rolling shutter, an image obtained through the optical system 110 including the focus lens 113 to generate an image signal corresponding to the captured image; the driving unit 140 that changes a distance to the focus lens 113 along an optical axis direction of the optical system 110; and the control unit 180 that controls the driving unit 140 so that the focus lens 113 focuses on a desired object, while the focus lens 113 is wobbling at the current focal position that is a minute reciprocating motion, wherein the control unit 180 (i) controls imaging timings at each of which the image sensor 150 generates the image signal based on the image, to generate blur signals having different amounts of blur, (ii) calculates information on a distance to an object to be displayed in a region, using at least one of the generated blur signals in the region, and (iii) controls the focus of the optical system 110 using the calculated information on the distance to the object.

Here, the blur signals are image signals captured at positions each of which differs in a distance between the focus lens 113 and the image sensor 150.

Accordingly, when the focus lens 113 in the optical system 110 is wobbling and the image sensor 150 captures an image using a rolling shutter, the control unit 180 can adjust the imaging timings at each of which an image signal is generated from the image formed by the image sensor 150, according to the position of the focus lens 113. In short, when the focus lens 113 is at a desired position, the video recording apparatus 1 can record video so that a difference in amount of blur included in image signals in a target region among image signals to be generated is larger than a difference in amount of blur included in image signals in a region outside of the target region. As a result, the video recording apparatus 1 can calculate, with a higher accuracy, distance information on the distance through the DFD, based on the image signals obtained by adjusting the imaging timings.

Furthermore, the control unit 180 controls timings at each of which the image sensor 150 captures an image so that a signal in a region for use in calculation of information on a distance is captured at a timing at which the focus lens 113 is at the nearest end or the farthest end while the focus lens 113 is wobbling.

Accordingly, since the signals in the target region can be divided into the signals captured at the near end and the signals captured at the far end, the difference in amount of blur between these two types of image signals can be increased. Thus, accuracy of the DFD cannot be degraded using the image signals captured in such a manner.

The control unit 180 further includes a designating unit that designates a specific region in the image signal generated by the image sensor 150, and controls the designating unit so that a region includes the specific region designated without any fail.

(Other Embodiments)

Embodiment exemplifies the techniques of the present disclosure. However, the techniques are not limited to such, and may be changed, replaced, and added as necessary.

For example, the image sensor 150 may be virtually divided into a matrix of 9 or 16 portions, and the designating unit may designate one of the portions.

Furthermore, although a rolling shutter starts from the end of the image sensor 150 in Embodiment, it may start from some midpoint of a column (row) in the image sensor 150.

Embodiment hereinbefore exemplifies the techniques of the present disclosure. Thus, the detailed description and the attached drawings are provided.

The constituent elements described in the detailed description and the attached drawings may include both essential ones for solving the problems and ones for exemplifying the techniques that are not essential for solving the problems. Thus, the detailed description and the attached drawings may include non-essential constituent elements.

Furthermore, since the embodiments herein exemplify the techniques of the present disclosure, various changes, replacement, addition, and omission may be performed within the scope of the claims or the equivalents.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present disclosure is applicable to video recording apparatuses using a rolling shutter, while a focus lens and an image sensor are wobbling to periodically change the distance between the focus lens and the image sensor. Specifically, the present disclosure is applicable to video cameras.

The invention claimed is:

1. A video recording apparatus, comprising:
an optical system including a focus lens;
an image sensor that generates an image signal based on an image obtained through the optical system, using a rolling shutter;
a driving unit configured to change a distance between the focus lens and the image sensor, along an optical axis of the optical system; and
a control unit configured to control the driving unit so that the focus lens focuses on an object, while at least one of the focus lens and the image sensor is wobbling to periodically change the distance between the focus lens and the image sensor,
the control unit including:
a region identifying unit configured to identify a region in the image;
a timing adjusting unit configured to adjust imaging timings according to the distance between the focus lens and the image sensor to increase a difference between an amount of blur obtained from a first image signal in the identified region and an amount of blur obtained from a second image signal in the identified region, each of the imaging timings being a timing at which the first image signal or the second image signal corresponding to the image is generated;
a distance calculating unit configured to calculate distance information on a distance to the object to be displayed in the identified region, using image signals including the first image signal and the second image signal in the identified region among image signals generated at the adjusted imaging timings; and
a focal position determining unit configured to determine a focal position between the focus lens and the image sensor, using the distance information.

2. The video recording apparatus according to claim 1, wherein the timing adjusting unit is configured to adjust the imaging timings so that (i) when the video recording apparatus captures a first image, the image signals in the region are captured at a near end at which the distance between the focus lens and the image sensor is shortest during the wobbling, and (ii) when the video recording apparatus captures a second image, the image signals in the region are captured at a far end at which the distance between the focus lens and the image sensor is longest during the wobbling, the region being identified by the region identifying unit.

3. The video recording apparatus according to claim 1, wherein the timing adjusting unit is configured to, when the region identifying unit newly identifies a region that is different from the region, readjust the imaging timings based on the newly identified region.

4. The video recording apparatus according to claim 1, further comprising
a designating unit configured to designate a region,
wherein the region identifying unit is configured to identify the region designated by the designating unit.

5. A focusing method for a video recording apparatus that includes: an optical system including a focus lens; an image sensor that generates an image signal based on an image obtained through the optical system, using a rolling shutter; and a driving unit that changes a distance between the focus lens and the image sensor, along an optical axis of the optical system, the method comprising:
identifying a region in the image;
adjusting imaging timings according to the distance between the focus lens and the image sensor to increase a difference between an amount of blur obtained from a first image signal in the identified region and an amount of blur obtained from a second image signal in the identified region, each of the imaging timings being a timing at which the first image signal or the second image signal corresponding to the image is generated;
calculating distance information on a distance to the object to be displayed in the identified region, using image signals including the first image signal and the second image signal in the identified region among image signals generated at the adjusted imaging timings; and
determining a focal position between the focus lens and the image sensor, using the distance information.

* * * * *